(12) United States Patent
Gottfried (10) Patent No.: US 9,577,471 B2
(45) Date of Patent: Feb. 21, 2017

(54) POWER SYSTEM FOR PROVIDING AN UNINTERRUPTIBLE POWER SUPPLY TO AN EXTERNAL LOAD

(71) Applicant: Carlos Gottfried, Mexico City (MX)

(72) Inventor: Carlos Gottfried, Mexico City (MX)

(73) Assignee: POWER GROUP INTERNATIONAL CORPORATION, Laredo, TX (US)

( * ) Notice: Subject to any disclaimer, the term of this patent is extended or adjusted under 35 U.S.C. 154(b) by 515 days.

(21) Appl. No.: 14/179,768

(22) Filed: Feb. 13, 2014

(65) Prior Publication Data

US 2015/0229162 A1 Aug. 13, 2015

(51) Int. Cl.
*H02J 7/00* (2006.01)
*H02J 9/06* (2006.01)

(52) U.S. Cl.
CPC .......... *H02J 9/066* (2013.01); *H02J 2009/068* (2013.01); *Y02E 60/16* (2013.01); *Y10T 307/62* (2015.04)

(58) Field of Classification Search
CPC ..... H02J 9/066; H02J 2009/068; Y02E 60/16; Y10T 307/62
USPC ......................................................... 307/65
See application file for complete search history.

(56) References Cited

U.S. PATENT DOCUMENTS

| | | | |
|---|---|---|---|
| 2,688,704 A | 9/1954 | Christenson | |
| 3,221,172 A | 11/1965 | Rolison | |
| 3,305,762 A | 2/1967 | Geib, Jr. | |
| 3,458,710 A * | 7/1969 | Dodge | H02J 9/08 290/30 R |
| 3,810,116 A | 5/1974 | Prohofsky | |
| 4,460,834 A * | 7/1984 | Gottfried | H02J 9/066 290/30 A |
| 4,686,375 A * | 8/1987 | Gottfried | H02J 9/066 290/2 |
| 5,053,635 A | 10/1991 | West | |
| 5,646,458 A | 7/1997 | Bowyer et al. | |
| 5,767,591 A | 6/1998 | Pinkerton | |
| 5,811,960 A | 9/1998 | Van Sickle et al. | |
| 8,227,938 B2 | 7/2012 | Gottfried | |
| 2010/0283350 A1 * | 11/2010 | Surodin | H02K 7/025 310/208 |

* cited by examiner

*Primary Examiner* — Jared Fureman
*Assistant Examiner* — Duc M Pham
(74) *Attorney, Agent, or Firm* — Egbert Law Offices, PLLC (57) ABSTRACT

A power system for providing an uninterruptible power supply to an external load has a first motor adapted to be connected to a source of power, a flywheel/generator adapted to supply power to the external load, a standby generator switchably electrically connected to the flywheel/generator, and a second motor drivingly connected to the generator/motor and to the internal combustion engine. The second motor is electrically connected to the power supplied by the flywheel/generator. The first motor is drivingly connected to the flywheel/generator. The flywheel/generator is electrically isolated from the source of power. The standby generator has an internal combustion engine that is driving connected to a generator/motor. The generator/motor is adapted to supply power to the flywheel/generator or the external load upon a change in power supplied by the flywheel/generator or the source of power. The second motor is an AC squirrel cage induction motor.

19 Claims, 3 Drawing Sheets

POWER SYSTEM FOR PROVIDING AN UNINTERRUPTIBLE POWER SUPPLY TO AN EXTERNAL LOAD

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to uninterruptible power systems. More particularly, the present invention relates to no-break power supplies that keep an external load electrically isolated from the power supply while assuring adequate power to the external load. The present invention also relates to standby power systems for supplying power to an external load in the event of an interruption or change of power provided by the source of power.

2. Description of Related an Including Information Disclosed Under 37 CFR 1.97 and 37 CFR 1.98

It is customary in situations of critical electrical power requirements to provide an auxiliary power source which can be switched to and from the load in the event of commercial power failure or excessive power variations. In some situations, however, the criticality of the load is such that interruptions or variations in power caused by such switching, although slight, cannot be tolerated. For example, during the countdown period prior to launch of a space vehicle, it is very important that the power supplying the load to the various computers and data equipment be uninterrupted. Typically, computer systems require a constant power supply. Interruptions in the power supply can erase memory and injure the software and hardware of the computer. Other situations where uninterruptible power supplies are considered important include: automatic banking services, automatic industrial processes, communication and signaling centers for maritime and aerial transportation, radio and television stations, and various emergency and security services.

Commercial power alone is generally not considered sufficiently reliable as a sole source of power for such usages. Interruptions commonly occur and loads may vary as other users come on and off the commercial power line. These problems are enhanced in the lesser developed countries where power systems are only in the initial stage of development.

Uninterruptible power systems are generally known within the prior art. Such uninterruptible power supplies usually comprise a generator and two prime movers, one of which normally drives the generator, and the other normally being stationary. When the normally operating prime mover ceases to function for any reason, the normally stationary prime mover is brought up to speed and is connected to drive the generator, usually through a clutch, thereby insuring a continuous supply of current from the generator. Commonly, a kinetic energy supply and device such as a flywheel or a D.C. dynamoelectric machine is coupled to the generator and supplies energy thereto during the transitional period when the generator load is being transferred from one prime mover to the other. One prior art type of no-break power supply comprises an internal combustion engine adapted to be connected through a normally disengaged clutch to a flywheel, the flywheel being connected in turn to the rotor of an electric generator which in turn is connected to the rotor of an A.C. motor. Another prior art type of no-break power supply employs a D.C. dynamoelectric machine in place of the flywheel, both of these devices acting to supply kinetic energy during the aforementioned transitional period.

In the operation of a prior art no-break power supply of either of the aforementioned types, the generator and kinetic energy supplying device are normally driven by the A.C. motor. When there is a failure of the A.C. motor, as, for example, may be caused by an interruption in the power supplied to the A.C. motor, the internal combustion engine is started automatically, brought up to speed, and the clutch is then engaged. The internal combustion engine then drives the generator. During the transitional period when the load is being shifted from one prime mover to the other, the kinetic energy of the flywheel or D.C. machine is utilized to maintain the rotation of the generator.

The prior art shows the number of patented devices that supply uninterruptible power to an external load. U.S. Pat. No. 2,688,704 describes a motor-generator-engine assemblage arranged so as to provide a constant source of electrical power. This device employs a clutch as the switching arrangement. U.S. Pat. No. 3,221,172 is a no-break power supply employing a differential between the primary motor and the standby motor. U.S. Pat. No. 3,305,762 discloses an improved method for maintaining the supply of electrical energy to a load during an interruption of the normal supply of electrical power. This device employs a clutch of the eddy current type. U.S. Pat. No. 3,458,710 is an emergency power system providing an uninterrupted power source having an electric generator for supplying energy to a load, a first motor adapted to be connected to a source of power external as a power system, and a second motor for driving the generator. This system also provides an auxiliary generator driven by a diesel engine for supplying the second motor through a relay connection. Finally, U.S. Pat. No. 3,810,116 relates to systems for capturing the information stored in a volatile semiconductor memory during the loss of electric power.

Typically, these prior art uninterruptible power supplies have a number of disadvantages. In certain devices, the clutch or differential is a weak mechanical link in the system and from time to time requires replacement. Generally speaking, the internal combustion engine, clutch, flywheel, a generator, and A.C. motor must be mounted end-to-end with their respective shafts coupled together. This creates a power supply of considerable physical length which can be difficult to install in a small area. Auxiliary controls must be provided to start the internal combustion engine, to bring it up to speed, and to engage the generator at the proper time. Many of the prior art devices do not operate as load isolators from the power line during normal operations. As a result, fluctuations in electrical power, such as brownouts, would continue to affect the external load.

In order to overcome these problems associated with the prior art, the present inventor developed uninterruptible power systems that are the subject of several patents. For example, U.S. Pat. No. 4,460,834, issued on Jul. 17, 1984 to the present inventor, describes an uninterruptible power system for providing an uninterruptible power supply to an external load. The power system includes a flywheel generator, a first motor, a standby generator, and a transfer controller. The flywheel generator is adapted to supply power to the external load. The first motor is drivingly connected to the flywheel generator. The first motor is adapted to be connected to a source of power external to the power system. The standby generator is electrically connected to the first motor. A standby motor is drivingly connected to the standby generator. The transfer controller is adapted to switchably interconnect the first motor to the source of power and to interconnect the standby generator to the first motor.

U.S. Pat. No. 4,686,375, issued on Aug. 11, 1987 also to the present inventor, shows an uninterruptible power supply co-generation system which includes a first generator connected to a primary external load, a second generator connected to a secondary external load, and a prime mover connected to the first and second generators by a common shaft. The first generator is electrically isolated from the secondary external load. The prime mover is an internal combustion engine that supplies rotational movement to the common shaft. The secondary external load is the electrical utility. A thermal recovery system is connected to the internal combustion engine.

U.S. Pat. No. 8,227,938, issued on Jul. 24, 2012 also to the present inventor, discloses a batteryless starter for an uninterruptible power system. This uninterruptible power systems includes a motor generator means for conditioning electric power, a backup generator means having an internal combustion engine having an electrically-driven starter so as to provide backup electric power, an electrical switch that is electrically connected to power mains and to the electrical output of the backup generator and to the electrical input of the motor generator for selectively switching power from the electric means and the backup generator to the motor generator. The starter switch is electrically connected to the output of the motor generator and electrically connected to the input of the starter system for switchably connecting the output of the motor generator to the starter.

A variety of other patents have also issued relating to such uninterruptible power systems that address certain problems found in the prior art. For example, U.S. Pat. No. 5,053,635, issued on Oct. 1, 1991 to G. West, provides an uninterruptible power supply with a variable speed drive which drives a synchronous motor/generator. The synchronous motor/generator and the variable speed drive are connected to inductively accelerate the motor/generator to near synchronous speed. When the motor/generator assembly reaches near synchronous speed, the motor/generator is switched to synchronous operation, while still under control of the variable speed drive. The variable speed drive is connected to maintain synchronicity with the motor/generator during acceleration.

U.S. Pat. No. 5,646,458, issued on Jul. 8, 1997 to Bowyer et al., provides an uninterruptible power supply that provides conditioned AC power to a critical load. This uninterruptible power system includes a variable speed drive that operates in response to AC utility power or to a standby DC input by providing a motor drive signal. The uninterruptible power supply power conditioning unit further includes a motor-generator that operates in response to the motor drive output by providing the conditioned AC power to the critical load. In response to an outage in the utility AC power, standby DC power is provided by a standby DC power source that includes a variable speed drive and a flywheel motor-generator connected to the variable speed drive. Both the power conditioning unit and the standby DC power source are initially operated in response to the utility AC power. The flywheel motor-generator stores kinetic energy in a rotating flywheel. When an outage occurs, the rotating flywheel continues to operate the flywheel motor-generator of the standby DC power source so as to cause the production of AC power which is rectified and provided as standby DC power to operate the variable speed drive of the power conditioning unit until either the utility AC power outage is over or a standby emergency generator is brought on line.

U.S. Pat. No. 5,767,591, issued on Jun. 16, 1998 to J. F. Pinkerton, discloses a method and apparatus for providing startup power to a genset-backed uninterruptible power supply. In this apparatus, the flywheel energy storage device produces three-phase AC voltage and is used to provide temporary power to a critical load while a backup power supply, such as a diesel generator set is accelerated to full speed. The startup power for the genset is also provided from the flywheel energy storage device through a circuit that converts the AC voltage at one level to DC voltage at a lower level.

U.S. Pat. No. 5,811,960, issued on Sep. 22, 1998 to Van Sickle et al., teaches a batteryless uninterruptible power supply. This power supply converts mechanical rotation generated by a local power source to electrical power in the event of commercial line power distortion or failure. The uninterruptible power supply uses a voltage and frequency-tolerant rectifier-inverter combination that converts the decaying output of a de-accelerating synchronous alternating current machine to a stable alternating current voltage for driving a critical load.

A problem associated with these prior art mechanisms is the amount of delay involved in bringing the internal combustion engine up to a synchronous speed for the production of power. In most circumstances where an internal combustion engine is used or, in particular, a diesel engine is used, a starter is required in order to charge a flywheel to begin the operation of the engine. The starter is typically powered by DC power. As such, there is a small delay (of approximately four to six seconds) in achieving full power production from the engine. As such, a need has developed so as to provide a system whereby the internal combustion engine can be accelerated more quickly and brought up to synchronous speed in a rapid manner.

Starters are somewhat notorious for unreliable operation. As such, whenever the ability to start the internal combustion engine is dependent upon a starter, users of the uninterruptible power supply system are often concerned that if there were a failure of the starter, the backup generator would not be effective in maintaining the uninterruptible load. As such, a redundant system is felt to be desirable so as to assure that internal combustion engine is always operable, even in the event of starter failure.

It is an object of the present invention to provide an uninterruptible power supply system that can be reliably started.

It is another object of the present invention to provide an uninterruptible power supply system that enhances the acceleration of the internal combustion engine for the generation of backup power.

It is another object of the present invention to provide an uninterruptible power supply system that avoids the use of batteries.

It is still another object of the present invention to provide an uninterruptible power supply system that minimizes the amount of control technology required for the operation of the system.

It is a further object of the present invention to provide an uninterruptible power supply system that effectively avoids voltage drops during the startup of the standby generator.

These and other objects and advantages of the present invention will become apparent from a reading of the attached specification and appended claims.

BRIEF SUMMARY OF THE INVENTION

The present invention is a power system for providing an uninterruptible power supply to an external load. This power system includes a first motor adapted to be connected to a source of power, a flywheel/generator adapted to supply power to the external load, a standby generator switchably electrically connected to the flywheel/generator, and a second motor drivingly connected to the standby generator and electrically connected to the power supplied by the flywheel/generator or to another source of power. The first motor is drivingly connected to the flywheel/generator. The flywheel/generator is electrically isolated from the source of power. The standby generator has an internal combustion engine that is driving connected to a generator/motor. The generator/motor is adapted to supply power to the flywheel/generator or to an external load upon a change in power supplied by the flywheel/generator or the source of power. The second motor is drivingly connected to the generator/motor and to the internal combustion engine.

In the present invention, the internal combustion engine has a starter. This is starter is switchably electrically connected to the power supplied by the flywheel/generator such that the starter is started in the event of a change in the power supplied by the flywheel/generator or the source of power. The starter is powered by direct current. A rectifier is electrically connected to the power supplied from the flywheel/generator so as to convert AC power from the power supply from the flywheel/generator into direct current to the starter.

The second motor is an AC induction motor drivingly connected to the generator/motor and to the internal combustion engine. The second motor is electrically connected to the power supply from the flywheel/generator. In the preferred embodiment of the present invention, the second motor has a magnesium alloy rotor so as to provide high torque, high slip and low inrush. In particular, the second motor is an AC squirrel cage induction motor.

The standby generator can be electrically connected to the source of power. The standby generator is adapted to supply power directly to the external load upon an interruption of power by the flywheel/generator.

The present invention is also standby power supply suitable for supplying power to an external load. This standby power supply includes an internal combustion engine having a starter, a generator/motor adapted to supply power to the external load, a source of power, an AC motor drivingly connected to the generator/motor, and a source of power electrically connected to the starter of the internal combustion engine and to the AC motor. The internal combustion engine is driving connected to the generator/motor.

In this standby power supply system of the present invention, a rectifier is electrically connected to the source of power and to the starter of the internal combustion engine. The rectifier is suitable for converting AC power from the source of power into a direct-current to the starter. The second motor is an AC squirrel cage induction motor having a magnesium alloy rotor. The internal combustion engine is a diesel engine. The source of power can be a flywheel/generator.

The foregoing Section is intended to describe, with particularity, the preferred embodiments of the present invention. It is understood that modifications to the preferred embodiments can be made within the scope of the present invention. As such, this Section is not intended, in any way, to be limiting of the broad scope of the present invention. The present invention should only be limited by the following claims and their legal equivalents.

DETAILED DESCRIPTION OF THE INVENTION

Figure 1:
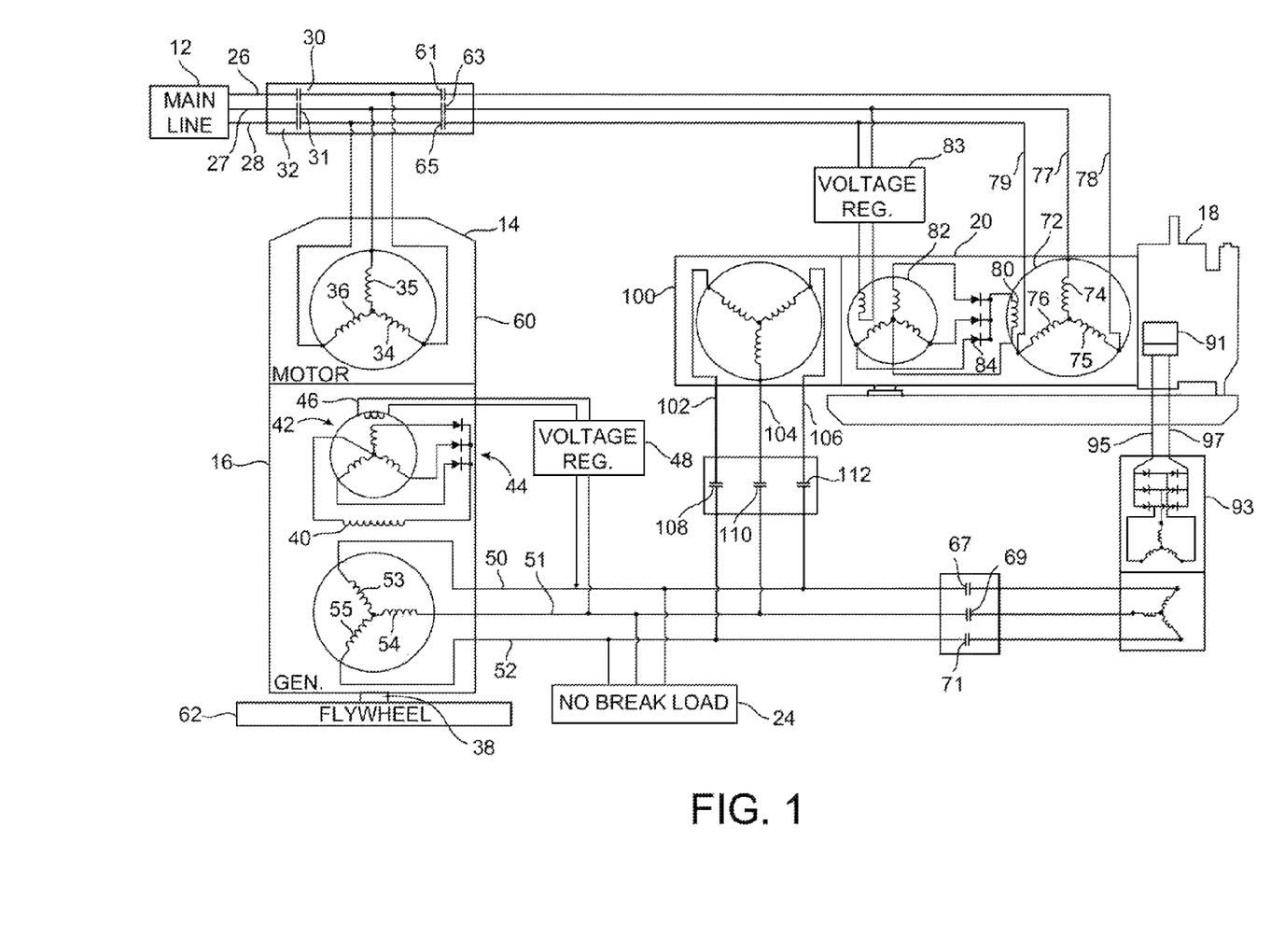
FIG. 1 is a schematic illustration showing the preferred embodiment of the uninterruptible power system in accordance with the teachings of the present invention.

Referring to FIG. 1, there is shown the uninterruptible power system 10 in accordance with the teachings of the present invention. The uninterruptible power system 10 includes an external power source 12, a first motor 14, a first generator 16, a standby engine 18, and a standby generator 20. Each of these components are arranged and adapted so as to provide an uninterruptible power supply to the external load 24.

The external power source 12 is a utility power line. This utility power line supplies the system typically with three-phase 120 or 230 volts AC. The external power source 12 receives its power from the utility power company. This power is passed from the utility to the uninterruptible power system of the present invention along lines 26, 27 and 28.

The first motor 14 is connected to the lines 26, 27 and 28. These lines can be associated with a suitable transfer controller 29 so as to control the operation of the various contactors 30, 31 and 32. Contactors 30, 31 and 32 are suitable switches so as to disconnect the motor 14 from the power as transferred along lines 26, 27 and 28. In this manner, the first motor 14 is adapted to receive power from the external power source 12. The first motor 14 is a three-phase induction squirrel cage AC motor. This motor 14 has high-torque, low-slip, reinforced windings, NEMA Class F insulation and reconnectable terminals for different line voltages. Lines 26, 27 and 28 are respectively connected to the motor 14 by stator windings 36, 35 and 34, respectively. Through this arrangement, the external power source 12 causes induction motor 14 to create torque on a shaft within the motor 14.

The flywheel/generator 16 is a synchronous three-phase generator. Flywheel/generator 16 has high-frequency rectified excitation. It is brushless, has reinforced windings, N.E.M.A. Class F insulation, and reconnectable terminals. As illustrated, the flywheel/generator 16 supplies, under those normal and power-continuing conditions, a single or three-phase load. The field 40 of the generator receives power from an exciter 42. The rotor winding is connected through conventional rectifiers 44 to the field winding 40 of the flywheel/generator 16. The exciter 42 has a field winding 46 which receives power from the flywheel/generator 16 under the control of a conventional voltage regulator 48. Flywheel/generator 16 and exciter 42 are conventional brushless units. The rotor of each of these machines is mounted on the shaft of the motor 14. The rectifiers 44 are carried on a support which also rotates with the shaft of the motor 14.

The voltage regulator 48 acts to increase or decrease the excitation of exciter field winding 46 to maintain the output voltage at a desired value. Once the flywheel/generator 16 obtains a substantially rated speed, the regulator 48 is able to sufficiently influence the excitation of flywheel/generator 16 to maintain the output voltage of the latter at substantially the desired value. The output voltage of the flywheel/generator 16 is passed to the external load 28 along lines 50, 51 and 52. Lines 50, 51 and 52 respectively connect with stator windings 53, 54 and 55 of the flywheel/generator 16. The voltage regulator 48 is connected to lines 50 and 51.

The motor 14 and the flywheel/generator 16 are arranged within a single vertical housing 60. Housing 60 is arranged about the flywheel 62. Flywheel 62 is mounted to the shaft 38 which extends from the motor 14. Flywheel 62 is free to rotate as needed. Shaft 38 is attached to the vertical axis of the flywheel 62. Shaft 38 extends vertically upwardly from the flywheel 62 into housing 60. The vertical shaft is received and acted upon by the motor 14 and the flywheel/generator 16.

The standby generator of the uninterruptible power system 10 of the present invention includes an internal combustion engine 18 and a generator/motor 20. The internal combustion engine is a diesel-type conventionally having a water-cooled radiator, a water pre-heater, along with low oil pressure and high water temperature protection. The internal combustion engine 18 is automatically speed regulated. The generator/motor 20 has stator windings 74, 75 and 76. Stator windings 74, 75 and 76 are connected to lines 77, 78 and 79, respectively. Lines 77, 78 and 79 extend from the generator/motor 20 to a suitable transfer controller. As such, the lines 77, 78 and 79 can be switchably connected to the flywheel/generator 16 or to the load 24.

The generator/motor 20 is of a type similar to that of the flywheel/generator 16. Specifically, the generator/motor 20 includes a field 80 and exciter 82. Conventional diodes 84 are arranged with respect to the armature windings of exciter 82. A suitable voltage regulator 83 can be connected to the field windings. The voltage regulator can be of a conventional type, such as shown by voltage regulator 48. The voltage regulator can be connected to lines 77 and 79. The voltage regulator would serve to maintain power generated by generator/motor 20 to a desired level. The field 80 and the stator 72 serve to transmit sufficient motive power to assist in the rapid acceleration of the internal combustion engine 18 during start-up after a line power interruption.

The transfer controllers associated with the present invention are adapted so as to receive lines 26, 27 and 28 from the external power source 12, and receive lines 77, 78 and 79 from the generator/motor 20. These lines are arranged within the transfer controller so as to allow the controller to change current sources as necessary to maintain the continuous flow of power to the external load 24. The transfer controller will include metering equipment for voltage, current, frequency, generator voltage regulators, magnetic contactors and relays, a manual three-phase circuit breaker, indicator lights for normal and abnormal operation, elapsed hours meters, and an enclosure. The operation of the transfer controller in conjunction with interruptions or outages of power from the external power source 12 will described hereinafter. The transfer controller can also be cooperative with any changes in the power produced by the flywheel/generator 16.

The basic operation of the present invention is as follows. Initially, the contactors 30, 31 and 32 are closed on lines 26, 27 and 28 from the external power source 12 so as to allow power to pass from the external power source 12 to the first motor 14. In this manner, the utility line supplies normal operating power to the AC induction motor 14. Induction motor 14 includes the common shaft 38 (and associated components) to constantly spin at or close to the synchronous speed (50 or 60 Hz). The spinning of the shaft 38 causes the flywheel/generator 16 to supply power to the external load 24. The power passes from the flywheel/generator 16 through lines 50, 51 and 52 to the external load 24. The external load can be any device that requires uninterruptible constant power. This can include computers, communication equipment, warning devices, etc. In normal operation, the flywheel/generator 16 will be the only source of power to the load. The main utility line associated with the external power source 12 is isolated from the external load 24. As long as the flywheel rotates at, or close to, synchronous speed, and the flywheel/generator continues to produce power, as required by the external load, a continuous supply of power is achieved.

During this normal operation, the standby engine 18 is maintained in full readiness. In other words, the engine 18 is pre-heated with a thermostat-controlled heater. Diesel lines are purged and full of fuel. The standby system only comes into operation upon an interruption in the power provided by the external power source 12 or by a change in the power output produced by the flywheel/generator 16 beyond acceptable levels.

When a power failure occurs, the following sequence of events will occur so as to maintain continuous power to the external load 24. Initially, the power from the external power source 12 is interrupted or stopped. This may either be a "brown out" (low voltage), a missing phase, or a black out (total interruption). The transfer controller will open the contactors 30, 31 and 32 so as to remove the first motor 14 from the external power source 12. Similarly, contactors 67, 69 and 71 will be closed so as to allow the power to pass between the flywheel/generator 16 to the standby generator 20. When the power loss occurs, the flywheel 62 associated with the shaft 38 takes command as the prime mover in the system so as to continue generating power from the flywheel/generator 16 to the external load 24. The flywheel should have enough rotational momentum to continue to provide sufficient levels of power to the external load while the standby system becomes operational. The transfer controller can close lines 67, 69 and 71 so as to connect the external load 24 such that power is received from the standby generator 20. Simultaneously, the electric starter 91 associated with the standby engine 18 is actuated. This will cause the diesel engine to start firing, the engine oil pressure to rise and power to be generated. After the diesel engine begins firing, the starter motor 91 can be disconnected.

When the standby engine 18 reaches 10% of its normal operating speed, the generator/motor 20 begins to produce a noticeable voltage. Because this voltage is being produced at lower frequency than the flywheel/generator 16, the induction motor will act as an induction generator and the synchronous flywheel/generator 20 will act as a synchronous motor. During this operation, the normal roles of these two machines are reversed, thereby providing a unique clutching action. The strength of the motorizing torque effect is due to the differences in frequencies and voltage. This voltage, in turn, is proportional to the speed of the generator/motor 20.

As the speed increases in the generator/motor 20, the motorizing torque also increases. The net effect is an extremely smooth but powerful clutch which increases the acceleration of the generator/motor 20 without severe strain or shock to the internal combustion engine 18.

When the generator/motor 20 reaches the same speed as the induction motor 14, the roles of induction motor 14 and flywheel/generator 16 revert to their normal function. At the same time, the flywheel ceases to be the prime mover for providing power to the external load 24. The standby generator system then becomes the prime mover for the first motor 14 and the rotating shaft 38. Since the flywheel will lose a bit of rotational momentum (speed) during the process of transferring power sources, the generator/motor 20 acts on the motor 14 so as to gradually accelerate the flywheel 62 and its associated flywheel/generator 16 back to the normal speed. It should be noted that the flywheel delivers full and continuous power within established frequency tolerances during the power transfer. Both the deceleration and re-acceleration of the flywheel 62 is accomplished at what is considered slow slew rates within allowable frequency limits.

After a pre-determined time following the return of power to the external power source 12, transfer controller will transfer the motor line from the first motor 14 to the lines associated with the external power source 12. The transfer controller will also shut down the standby engine 18 of the standby system. This completes the main line failure cycle and returns to the power system 10 to its normal operation.

Importantly, in the present invention, the starter 91 associated with the diesel engine 18 is an electric starter powered by direct current. As such, a transformer/rectifier 93 is connected by lines 95 and 97 to the starter 91. As such, when the contactors 67, 69 and 71 are closed, the AC power flowing the lines 50, 51 and 52 will be passed as direct current along lines 95 and 97 to the electric starter 91. As such, the electric starter 91 can provide the necessary starting power for the diesel engine 81.

Under certain circumstances, it is important to provide a redundant system in the event that the starter 91 should fail to function properly. If the starter 91 would fail to function properly, then the standby diesel engine 18 would not function and the system could potentially fail over time. As such, the present invention provides a second motor 100 in cooperation with the shaft of the diesel engine 18 and the generator/motor 20. The motor 100 is an AC squirrel cage induction motor drivingly connected to the generator/motor 20 and to the diesel engine 18. As can be seen, the second motor 100 is connected along lines 102, 104 and 106 so as to receive the AC power as generated from the flywheel/generator 16. In particular, in the event of a power loss, the transfer controller will close the contactors 108, 110 and 112 associated respectively with lines 102, 104 and 106. As such, the AC power flowing from the flywheel/generator 16 will serve to start the second motor 100. The second motor 100 has a magnesium alloy rotor so as to provide high torque, high slip and low inrush. The low inrush is particularly important in the present invention since it avoids an possible voltage dips that occur during the transfer of power from the flywheel/generator 16 to the motor 100. In addition, the high torque produced by the motor will rapidly accelerate the shaft of the diesel engine 18 to at least one-half of its rated capacity. This rapid acceleration of the diesel engine 18 will mean that the standby generator/motor 20 will begin to produce power more quickly than from the diesel engine 18 alone. It is believed that the motor 100 can rapidly accelerate the shaft of the diesel engine 18 to 900 rpms within three seconds.

As a result of the use of the second motor 100, two problems are solved. First, if there should be a failure of the electric starter 91, then the motor 100 can provide redundancy to the standby system so as to assure that the diesel engine is on-line. Secondly, if the starter 91 operates properly, then the second motor 100 serves to enhance the acceleration to the diesel engine 18 so that power is produced from the generator/motor 20 more rapidly. This all can occur without any diminished energy delivered to the load 24.

If other motors, such as DC motors, were used, then the power required to deliver sufficient torque to the shaft of the diesel engine 18 could create a voltage dip to the load 24. In other words, these types of motors would consume an enormous amount of power. With the development of magnesium alloy rotors, the relatively small second motor 100 is able to produce sufficient torque so as to start the diesel, will have high slip, and a very low inrush current.

Figure 2:
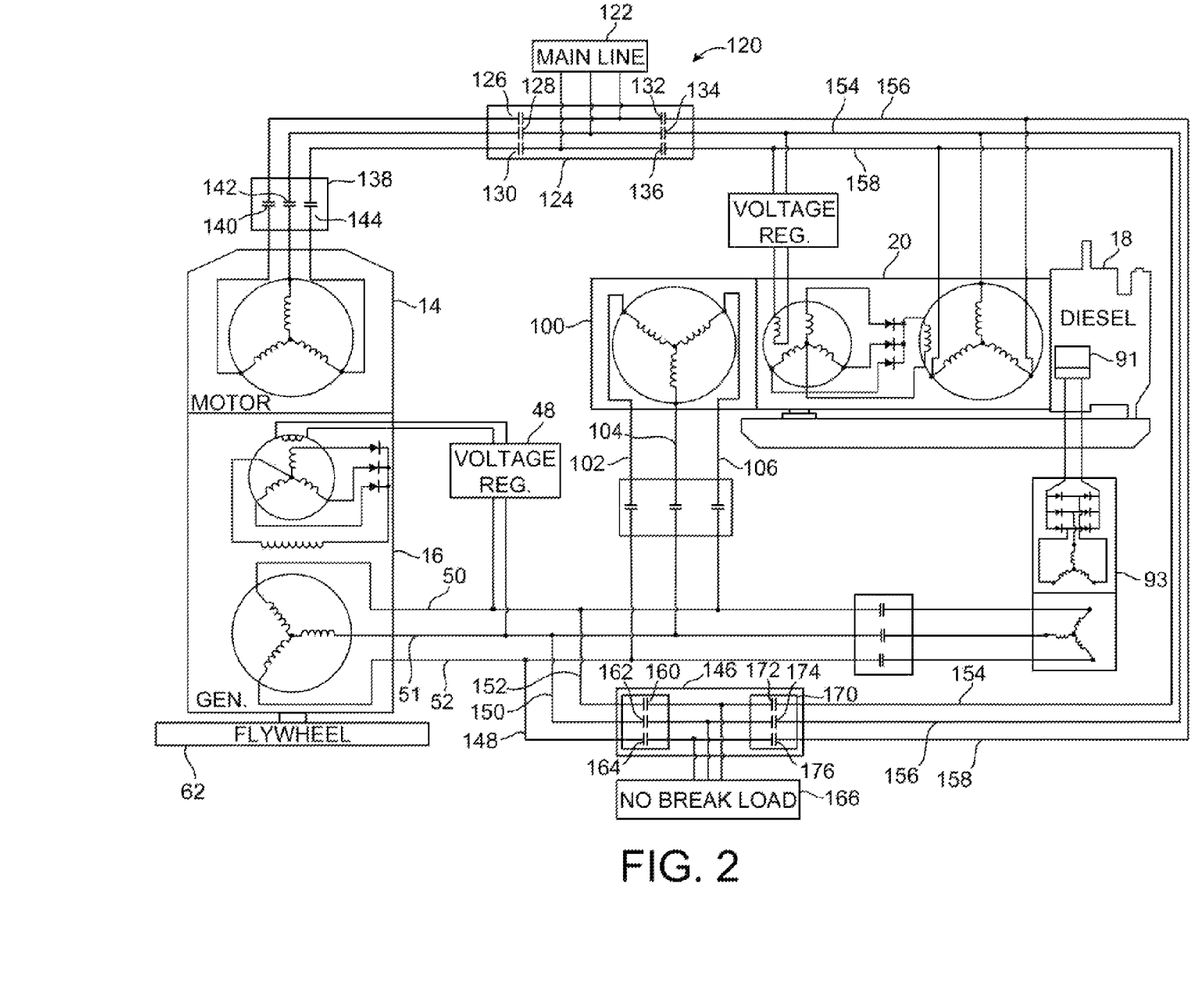
FIG. 2 is a schematic illustration showing the uninterruptible power supply system in accordance with an alternative embodiment of the present invention employing a synchronous bypass to the auxiliary motor/generator.

FIG. 2 shows an alternative embodiment of the system 120 of the present invention. In particular, system 120 includes the first motor 14, the first generator 16, the standby engine 18 and the standby generator 20 (of FIG. 1). The main load 122 supplies power to the transfer controller 124. Transfer controller 124 includes contactors 126, 128 and 130. Transfer controller 124 further includes contactors 132, 134 and 136. Contactors 126, 128 and 130 can close so as to supply power from the main line 122 through transfer controller 138. Transfer controller 138 includes contactors 140, 142 and 144. When the contactors 140, 142 and 144 are closed, power is supplied to the first motor 14 and the first generator 16 so as to cause a rotation of the flywheel 62. Voltage regulator 48 controls the power in the manner described in herein previously. The power supplied from the first generator can flow along lines 50, 51 and 52, as in the previous embodiment of FIG. 1, to the transformer/rectifier 93 so as to cause the starter 91 to start the standby engine 18.

Importantly, there is another transfer controller 146 that is connected by lines 148, 150 and 152 and also connected to lines 154, 156 and 158. Contactors 160, 162 and 164 can close so as to allow the power passing through lines 50, 51 and 52 to pass to the load 166.

A high slip motor 100 is provided in a configuration similar to that of the previous embodiment. The high slip motor 100 is connected by lines 102, 104 and 106 in accordance with the previous embodiment.

The system 120 provides further redundancy in the uninterruptible power system 10 of the present invention. This provides additional capabilities so as to assure that the load 166 is not interrupted by any change of power produced from the flywheel/generator 16 or from the external source of power 122. As such, lines 154 and 156 and 158 are connected by another transfer controller 170 to the load 166. Transfer controller 170 includes contactors 172, 174 and 176.

If there were a complete and catastrophic failure of the flywheel/generator 16, the diesel engine 18 (along with the associated generator/motor 20) is able to provide the requisite power directly to the load 166 once the contactors 172, 174 and 176 are closed. Under such circumstances, the contactors 126, 128 of 130 and/or the contactors 140, 142 and 144 will open so as to isolate the flywheel/generator 16 and the first motor 14 from the load 166. Additionally, or alternatively, the contactors 132, 134 and 136 of the transfer controller 124 will close so as to allow power from the main line 122 to be delivered to the load 166 along lines 154, 156, and 158. As a result, the load 166 can receive power from the main power supply 122 or receive power from the generator/motor 20 associated with the diesel engine 18. As a result, the catastrophic failure of the flywheel system will not interrupt the flow of power to the load.

Once the first motor 14, or the motor/generator 16 or the flywheel 62 are properly repaired and brought into service, the load 166 can continue to be supplied with power as in the previous embodiment of the present invention.

Figure 3:
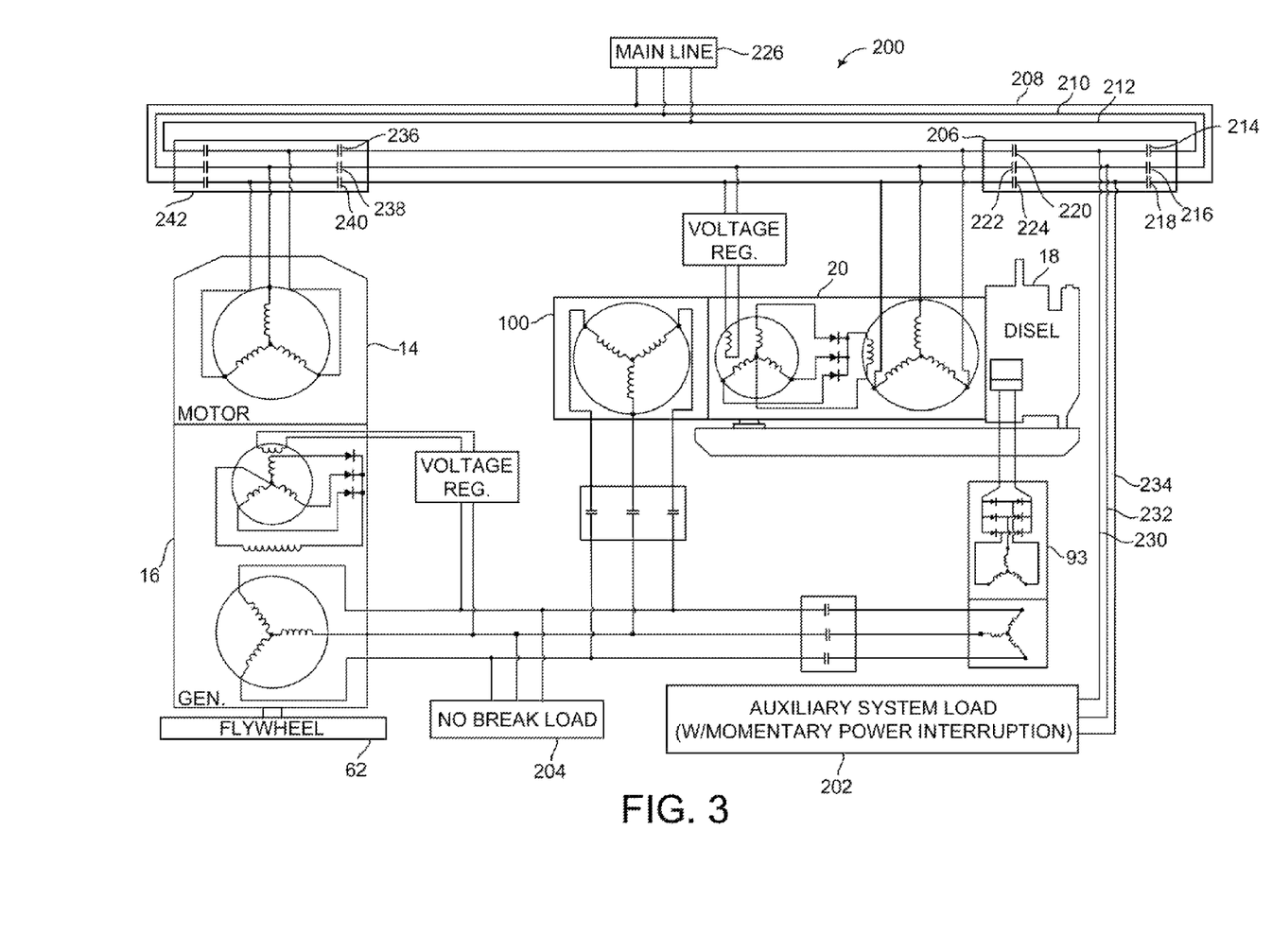
FIG. 3 is a schematic illustration showing on another alternative embodiment of the present invention in which the uninterruptible power system supplies power to an auxiliary load.

FIG. 3 shows a further alternative embodiment of the system 200 in accordance with the teachings of the present invention. In particular, the system 200 is utilized so as to supply power to an auxiliary load 200 from the components of the present invention. The system 200 is similar to the embodiment of FIG. 1 in that there is provided a first motor 14, a first generator 16 and a flywheel 62. The main load 204 will continue to be supplied with power directly from the first generator 16 as a result of the rotation of the flywheel 62 in the manner of the previous embodiment. FIG. 3 further shows that there is also a diesel engine 18 and a motor/generator 20, along with the high slip motor 100 in accordance with the teachings of the prior embodiments.

Importantly, in FIG. 3, it can be seen that there is a transfer controller 206 that is connected to the lines 208, 210 and 212 extending from the main line 200. The transfer controller includes contactors 214, 216 and 218. The transfer controller 206 further includes contactors 220, 222 and 224. The closings of the contactors 214, 216 and 218 will allow power from the main power supply 226 to pass along lines 208, 210 and 212 along lines 230, 232 and 234 to the auxiliary load 202. Additionally, power can be supplied to the auxiliary load 202 by a closing of the contactors 236, 238 and 240 associated with transfer controller 242. When contactors 236, 238 and 240 are closed, and when contactors 220, 222 in 224 are closed, power can flow to the auxiliary load 202. However, there is interruption in the main power supply 226, then contactors 214, 216 and 218 will open and contactors 220, 222 and 224 will close so as to allow power from the motor/generator 20 to be delivered to the auxiliary load 202.

As such, the system 200 provides power to an auxiliary load. Typically, the auxiliary load may be supplied with power from the main power line. However, if the auxiliary load does not require perfect uninterruptibility power, then the system 200 can be connected to such an auxiliary load 202 so as to ultimately supply power thereto. For example, if the main power supply is interrupted, then the associated contactors will close so that power can be delivered either from the first generator 16 or from the motor/generator 20. As such, the system 200 and the present invention allows power to be supplied on a perfectly uninterruptible basis to the primary load 204 and in a virtually uninterruptible manner to the auxiliary system.

The present invention offers a number of advantages over prior uninterruptible power systems. The uninterruptible power systems generally seen today are based on static-type electronic rectifier components and circuitry working in conjunction with a battery bank of limited duration. The present invention does not have an operating time limit as do batteries nor does it require high technology personnel and parts for installation, servicing or operation. Since no mechanical clutching mechanism is utilized in the present invention, the internal combustion engine is not subject to severe strain or wear. As a result, standard industrial or automotive engines may be used without the need to be reinforced or redesigned. In addition, the life and reliability of the engine will be much greater. Since there are no mechanical parts to wear in the clutch mechanism, there are no parts to replace or maintain. Any "clutching" that occurs in the present invention is a result of the electromagnetic components of the system.

The components of the present invention are electrically connected. Therefore, any component of the system can be conveniently separated from the other components of the system. This adds to flexibility and economy in locating the system.

Since many of the power systems of the lesser developed countries are either unstable or inadequate, the present invention eliminates many of the problems that can be encountered from blackouts and brownouts. As is mentioned previously, the external load is electrically isolated from the utility power line during the normal operation of the system. This prevents losses of computer memory and other data caused by utility line interruption, interference, or stoppage. It avoids the losses and stoppage of important electric and electronic apparatus. Since the power to the external load is isolated, the present invention further protects against disturbances caused by the switching from the utility line to the emergency system.

The cost of the present uninterruptible power system is considerably less than that of other systems. The components of the present invention are presently available at a relatively low cost. There is no added cost of purchasing battery banks, transformers, or intricate electronic equipment. Furthermore, the installation, maintenance, and operation of the equipment can be performed by persons having limited electric motor and generator experience.

The foregoing disclosure and description of the invention is illustrative and explanatory thereof. Various changes in the details of the illustrated apparatus may be made within the scope of the appended claims without departing from the true spirit of the invention. The present invention should only be limited by the following claims and their legal equivalents.

I claim:

1. A power system for providing an uninterruptible power supply to an external load, the power system comprising:
   a flywheel/generator adapted to supply energy to the external load;
   a first motor adapted to be connected to a source of power, said first motor drivingly connected to said flywheel/generator;
   a standby generator switchably electrically connected to said flywheel/generator, said standby generator switchably electrically connected to the external load or to said flywheel/generator, said standby generator having a generator/motor;
   a standby engine drivingly connected to said standby generator, said standby engine adapted to drive said standby generator upon a loss of the energy to the external load;
   a second motor drivingly connected to said standby generator; and
   a transfer controller adapted to switchably interconnect said standby generator to the external load or to said flywheel/generator in response to a change in the energy supplied by said flywheel/generator or by the source of power.

2. The power system of claim 1, said standby engine comprising an internal combustion engine drivingly connected to said generator/motor.

3. The power system of claim 2, said internal combustion engine comprising a diesel engine having a starter.

4. The power system of claim 3, said starter being switchably electrically connected to the power supplied from said flywheel/generator such that said starter is started in the event of a change in the power supplied from said flywheel/generator or from the source of power.

5. The power system of claim 4, said starter being powered by direct current, the power system further comprising:
   a rectifier electrically connected to the power supplied from said flywheel/generator so as to convert AC power from the power supply from the flywheel/generator into direct current to said starter.

6. The power system of claim 1, said second motor being an AC induction motor drivingly connected to said generator/motor and to said standby engine, said second motor being electrically connected to the power supplied from said flywheel/generator.

7. The power system of claim 6, said second motor having a magnesium alloy rotor so as to provide high torque, high slip and low inrush.

8. The power system of claim 1, said transfer controller for switchably connecting said standby generator to said flywheel/generator upon a change in power supplied by the source of power.

9. The power supply system of claim 1, said first motor isolating said flywheel/generator from the source of power.

10. A power system for providing an interruptible power supply to an external load, the power system comprising:
   a first motor adapted to be connected to a source of power;
   a flywheel/generator adapted to supply power to an external load, said first motor drivingly connected to said flywheel/generator, said flywheel/generator being electrically isolated from the source of power;
   a standby generator switchable electrically connected to said flywheel/generator, said standby generator having a generator/motor adapted to supply power to said flywheel/generator or to said external load upon a change in power supplied by said flywheel/generator or said source of power;
   a standby engine drivingly connected to said standby generator, said standby engine adapted to drive s standby generator upon a loss of the power to the external load, said standby generator having an internal combustion engine that is drivingly connected to said generator/motor; and
   a second motor drivingly connected to said generator/motor and to said internal combustion engine, said second motor electrically connected to the power supplied by said flywheel/generator.

11. The power system of claim 10, said internal combustion engine having a starter, said starter switchably electrically connected to the power supplied by said flywheel/generator such that said starter is started in the event of the change in power supply by said flywheel/generator or said source of power.

12. The power system of claim 11, said starter being powered by direct current, the power system further comprising:
   a rectifier electrically connected to the power supply from said flywheel/generator so as to convert AC power from the flywheel/generator into direct current to said starter.

13. The power system of claim 10, said second motor being an AC squirrel cage induction motor.

14. The power system of claim 13, said second motor having a magnesium alloy rotor so as to provide high torque, high slip and low inrush.

15. The power system of claim 10, said standby generator being electrically connected to the source of power, said standby generator adapted to supply power directly to the external load upon an interruption in power supplied by said flywheel/generator.

16. A standby power supply system suitable for supplying power to an external load, the standby power supply system comprising:
   an internal combustion engine having a starter;
   a generator/motor adapted to supply power to the external load, said internal combustion engine drivingly connected to said generator/motor;
   an AC motor drivingly connected to said generator/motor, said AC motor being a squirrel cage induction motor having a magnesium alloy rotor; and
   a source of power electrically connected to said starter of said internal combustion engine and to said AC motor.

17. The standby power supply system of claim 16, further comprising;
   a rectifier electrically connected to the source of power and to said starter of said internal combustion engine, said rectifier suitable for converting AC power from said source of power into a direct-current to said starter.

18. The standby power supply system of claim 16, said internal combustion engine being a diesel engine.

19. The standby power supply system of claim 16, said source of power being a flywheel/generator.

* * * * *